(12) United States Patent
Yoshida

(10) Patent No.: US 9,258,240 B2
(45) Date of Patent: Feb. 9, 2016

(54) AVAILABLE BANDWIDTH ESTIMATING DEVICE

(75) Inventor: Hiroshi Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 597 days.

(21) Appl. No.: 13/515,735

(22) PCT Filed: Oct. 19, 2010

(86) PCT No.: PCT/JP2010/006173
§ 371 (c)(1),
(2), (4) Date: Jun. 13, 2012

(87) PCT Pub. No.: WO2011/074163
PCT Pub. Date: Jun. 23, 2011

(65) Prior Publication Data
US 2012/0253761 A1    Oct. 4, 2012

(30) Foreign Application Priority Data

Dec. 14, 2009 (JP) ................................ 2009-282617

(51) Int. Cl.
*H04L 12/26* (2006.01)
*H04L 12/825* (2013.01)
(Continued)

(52) U.S. Cl.
CPC ............ *H04L 47/22* (2013.01); *H04L 43/0882* (2013.01); *H04L 43/0894* (2013.01); *H04L 47/14* (2013.01)

(58) Field of Classification Search
CPC ........ H04L 43/0876–43/0894; H04L 41/0896; H04L 47/28; H04L 47/522; H04L 47/10; H04N 19/000181; H04N 19/00181; G06F 17/10
USPC ............................................................ 703/2
See application file for complete search history.

(56) References Cited

U.S. PATENT DOCUMENTS 6,381,228 B1 *   4/2002   Prieto et al. .................... 370/323
6,549,515 B1 *   4/2003   Sourani et al. ................. 370/232
(Continued)

FOREIGN PATENT DOCUMENTS

JP    2008-278207 A    11/2008
JP    2009-118272 A     5/2009
(Continued)

OTHER PUBLICATIONS

Benameur et al, "Integrated Admission Control for Streaming and Elastic Traffic", QofIS 2001, LNCS 2156, pp. 69-81, 2001.*
(Continued)

*Primary Examiner* — Kamini S Shah
*Assistant Examiner* — Jay B Hann
(74) *Attorney, Agent, or Firm* — Sughrue Mion, PLLC

(57) ABSTRACT

An available bandwidth estimating device 300 is equipped with: a transmission rate acquiring part 301 configured to acquire a transmission rate, which is the amount of data transmitted by a transmitting device per unit time to a receiving device connected so as to be capable of communicating via a communication network; and an available bandwidth estimating part 302 configured to estimate the available bandwidth based on a mathematical model constructed by representing a relation between an available bandwidth, which is a communication bandwidth available in a communication path between the transmitting device and the receiving device, and the transmission rate by a dynamic model including a mobile body movable in a preset moving direction and an elastic body transforming in the moving direction by a movement amount of the mobile body having moved in the moving direction, and based on the acquired transmission rate.

17 Claims, 6 Drawing Sheets

(51) Int. Cl.
*H04L 12/815* (2013.01)
*H04L 12/801* (2013.01)

(56) References Cited

U.S. PATENT DOCUMENTS

| | | | |
|---|---|---|---|
| 6,788,646 B1* | 9/2004 | Fodor | H04L 12/5602 370/230 |
| 7,085,268 B2* | 8/2006 | Fukuda et al. | 370/389 |
| 7,292,574 B2* | 11/2007 | Pendakur et al. | 370/391 |
| 7,784,076 B2* | 8/2010 | Demircin et al. | 725/81 |
| 7,908,393 B2* | 3/2011 | Marr et al. | 709/232 |
| 8,000,240 B2* | 8/2011 | DelRegno et al. | 370/232 |
| 8,023,450 B2* | 9/2011 | Abedi | H04L 47/14 370/332 |
| 2007/0115814 A1* | 5/2007 | Gerla et al. | 370/230 |

FOREIGN PATENT DOCUMENTS

| | | |
|---|---|---|
| WO | 2007129134 A1 | 11/2007 |
| WO | 2009118602 A2 | 10/2009 |

OTHER PUBLICATIONS

Harnoy, A., "The Relation Between CDM Instability and Deborah Number in Differential Type Rheological Equations", Rheological Acta 32, pp. 483-489, 1993.*

Sarr et al, "Bandwidth Estimation for IEEE 802.11-Based Ad Hoc Networks", IEEE Transactions on Mobile Computing, vol. 7, No. 10, Oct. 2008.*

Written Opinion of the International Searching Authority, dated Nov. 16, 2010.*

Liu, Xiliang, et al. "A Stochastic Foundation of Available Bandwidth Estimation: Multi-Hop Analysis" IEEE/ACM Transactions on Networking, vol. 16, No. 1 (2008).*

Urvoy-Keller, Guillaume, et al. "Operational Comparison of Available Bandwidth Estimation Tools" ACM SIGCOMM Computer Communications Review, vol. 38, No. 1, (2008).*

Extended European Search Report dated Mar. 6, 2014, issued by the European Patent Office in corresponding European Application No. 10837201.2.

Masayoshi Kobayashi et al., "Transport layer control for throughput guarantee in TCP overlay networks," IEICE Technical Report, (8 pages), vol. 103, No. 313.

Manish Jain, et al., "End-to-End Available Bandwidth: Measurement Methodology, Dynamics, and Relation with TCP Throughput," Proc. SIGCOMM 2002, the Association for Computing Machinery, Oct. 2002, pp. 295-308, vol. 32.

Vinay J. Ribeiro et al., "pathChirp: Efficient Available Bandwidth Estimation for Network Paths," Rice University, pp. 1-12, [searched on Dec. 3, 2009], Internet <URL: http://www.spin.rice.edu/Software/pathChirp/>.

Ningning Hu, et al., "Evaluation and Characterization of Available Bandwidth Probing Techniques," Proc. IEEE Journal on Selected Areas in Communications, the Institute of Electrical and Electronics Engineers, Inc., Aug. 2003, pp. 879-893, vol. 21, No. 6.

* cited by examiner

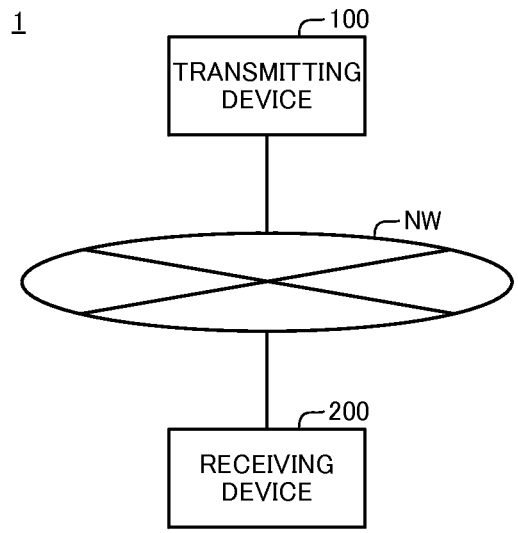
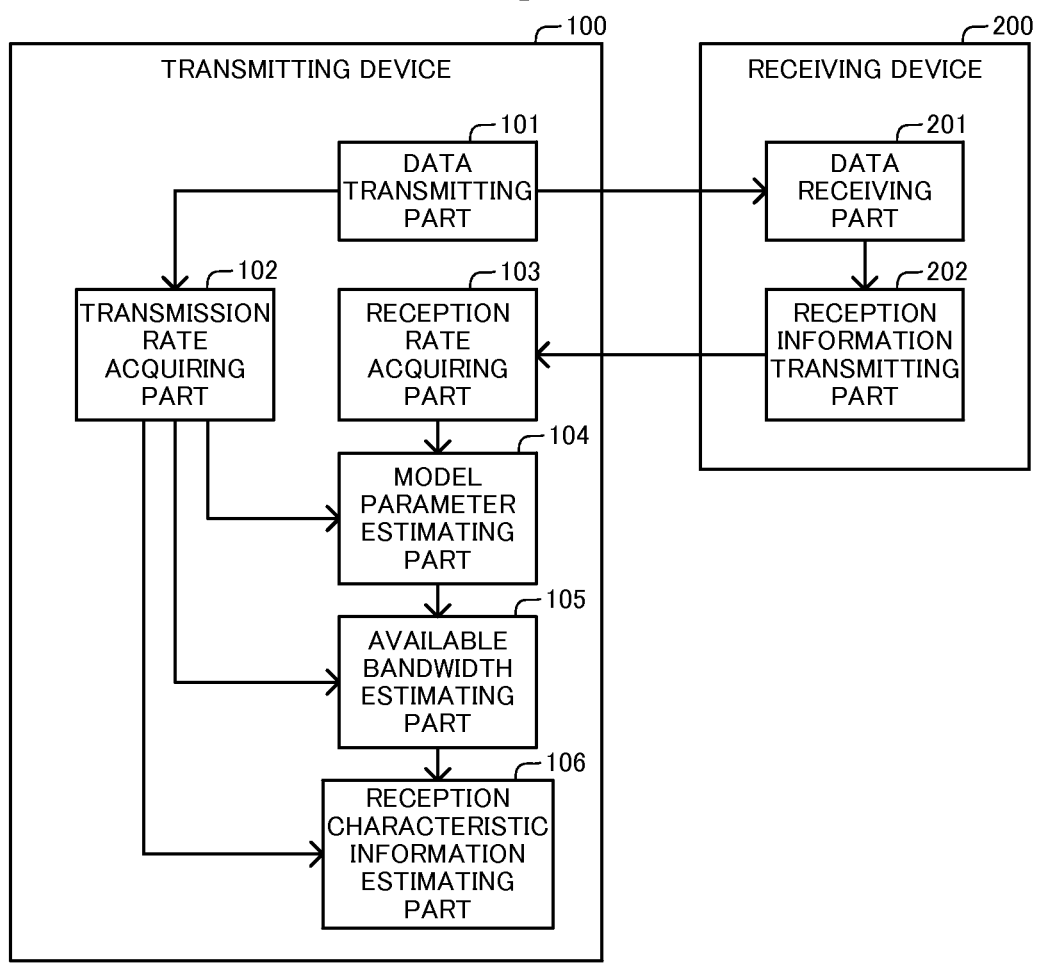

| NUMBER OF CROSS TRAFFIC | SPRING CONSTANT K | VISCOSITY COEFFICIENT D | FORCE-FREE DISTANCE W0 |
|---|---|---|---|
| 1 | 0.986 | 0.810 | −0.035 |
| 2 | 0.988 | 0.790 | −0.040 |
| 3 | 0.989 | 0.858 | −0.038 |
| 5 | 0.992 | 0.803 | −0.034 |
| 7 | 0.992 | 0.860 | −0.044 |
| 10 | 0.997 | 0.808 | −0.046 |
| 15 | 1.005 | 0.839 | −0.054 |
| 20 | 1.012 | 0.849 | −0.068 |
| 30 | 1.027 | 0.906 | −0.071 |

AVAILABLE BANDWIDTH ESTIMATING DEVICE

CROSS REFERENCE TO RELATED APPLICATION

This application is a National Stage of International Application No. PCT/JP2010/006173 filed Oct. 19, 2010, claiming priority based on Japanese Patent Application No. 2009-282617 filed Dec. 14, 2009, the contents of all of which are incorporated herein by reference in their entirety.

TECHNICAL FIELD

The present invention relates to an available bandwidth estimating device which estimates an available bandwidth in a communication network.

BACKGROUND ART

When a transmitting device transmits data to a receiving device via a communication network, part of the data may be lost in the communication network (data loss occurs, e.g., packet loss may occur in a case that the communication network is the IP (Internet Protocol) network). Moreover, a delay time, which is a time before the receiving device receives data after the data is transmitted from the transmitting device, may become excessive.

Particularly in a case that the transmitting device transmits data representing multimedia that the real time property of video, audio or the like is high, when data loss occurs and/or when a delay time becomes excessive, the quality of experience relatively largely decreases.

Therefore, it is thought to be preferred to accurately estimate an available bandwidth, which is a communication bandwidth available in a communication path between the transmitting device and the receiving device, and properly determine a transmission rate based on the estimated available bandwidth. Here, a transmission rate is the amount of data transmitted by the transmitting device to the receiving device per unit time.

Accordingly, a technique for estimating an available bandwidth has been developed. As this type of techniques, "Pathload" described in Non-Patent Document 1, "pathChirp" described in Non-Patent Document 2, "IGI" described in Non-Patent Document, and so on are known.

An available bandwidth estimating device to which these techniques are applied is configured to estimate an available bandwidth based on an equation 1 and an equation 2. At first, this available bandwidth estimating device estimates an available bandwidth $A_i(t)$ in a section i that is one of a plurality of sections configuring a communication path from the transmitting device to the receiving device, based on the equation 1.

$$A_i(t)=C_i(1-u_i) \quad \text{[Equation 1]}$$

The available bandwidth estimating device described above uses, as $C_i \times u_i$, an average value in a preset period of a communication bandwidth already used in the section i. Next, the available bandwidth estimating device estimates an available bandwidth $A(t)$ in a communication path based on the equation 2.

$$A(t)=\min\{A_i(t)\} \quad \text{[Equation 2]}$$

Thus, the available bandwidth estimating device described above calculates a value as the result of subtracting an already used communication bandwidth from a physical bandwidth for each of the sections configuring the communication path, and estimates the minimum value of the calculated values as an available bandwidth for the communication path.

[Non-Patent Document 1] M. Jain, C. Dovrolis, "End-to-End Available Bandwidth: Measurement Methodology, Dynamics, and Relation with TCP Throughput," Proc. SIGCOMM 2002, the Association for Computing Machinery, Vol. 32, pp. 295-308, October 2002

[Non-Patent Document 2] V. J. Ribeiro, R. H. Riedi, R. G. Baraniuk, J. Navratil, L. Cottrell, "pathChirp: Efficient Available Bandwidth Estimation for Network Paths," Rice University, [searched on Dec. 3, 2009], Internet <URL: http://www.spin.rice.edu/Software/pathChirp/>

[Non-Patent Document 3] N. Hu, P. Steenkiste, "Evaluation and Characterization of Available Bandwidth Probing Techniques," Proc. IEEE journal on selected areas in communications, the Institute of Electrical and Electronics Engineers, Inc., Vol. 21, No. 6, pp. 879-893, August 2003.

Data transmitted by a target device will be referred to as self-traffic. Moreover, data transmitted by another device by using a communication path that shares at least one section with a communication path from the target device to the receiving device will be referred to as cross traffic.

As a communication bandwidth used in a certain section increases, a data loss ratio and delay time relating to data flowing through the section increase. Therefore, in a case that the target device increases a transmission rate (a communication bandwidth to be used) relating to self-traffic, a data loss ratio and delay time relating to cross traffic increase.

On the other hand, in a case that the other device transmits data in compliance with TCP (Transmission Control Protocol), the other device is often configured to control to change the transmission rate depending on a data loss ratio, which is a ratio of occurrence of data loss, and/or a delay time.

Therefore, when the target device increases the transmission rate relating to self-traffic, the other device decreases the transmission rate relating to cross traffic. On the other hand, when the target device decreases the transmission rate relating to self-traffic, the other device increases the transmission rate relating to cross traffic. Thus, when the target device changes the transmission rate relating to self-traffic, the other device changes the transmission rate relating to cross traffic.

Therefore, the available bandwidth estimating device described above has a problem that it is impossible to estimate, with high accuracy, an available bandwidth when the transmission rate relating to self-traffic is changed.

SUMMARY

Accordingly, an object of the present invention is to provide an available bandwidth estimating device that is capable of solving the aforementioned problem, "it is impossible to estimate, with high accuracy, an available bandwidth when the transmission rate relating to self-traffic is changed."

In order to achieve the object, an available bandwidth estimating device as an exemplary embodiment of the present invention includes:

a transmission rate acquiring means for acquiring a transmission rate, which is an amount of data transmitted by a transmitting device per unit time to a receiving device connected so as to be capable of communicating via a communication network; and an available bandwidth estimating means for estimating an available bandwidth, which is a communication bandwidth available in a communication path between the transmitting device and the receiving device, based on: a mathematical model constructed by representing a relation between the available bandwidth and the transmission rate by a dynamic model including a mobile body that can move in a preset moving direction and an elastic body that transforms in the moving direction by a movement amount of movement of the mobile body in the moving direction; and the acquired transmission rate.

Further, an available bandwidth estimating method as another exemplary embodiment of the present invention is a method including:

acquiring a transmission rate, which is an amount of data transmitted by a transmitting device per unit time to a receiving device connected so as to be capable of communicating via a communication network; and estimating an available bandwidth, which is a communication bandwidth available in a communication path between the transmitting device and the receiving device, based on: a mathematical model constructed by representing a relation between the available bandwidth and the transmission rate by a dynamic model including a mobile body that can move in a preset moving direction and an elastic body that transforms in the moving direction by a movement amount of movement of the mobile body in the moving direction; and the acquired transmission rate.

Further, a program as another exemplary embodiment of the present invention is a program for causing an available bandwidth estimating device to realize:

a transmission rate acquiring means for acquiring a transmission rate, which is an amount of data transmitted by a transmitting device per unit time to a receiving device connected so as to be capable of communicating via a communication network; and an available bandwidth estimating means for estimating an available bandwidth, which is a communication bandwidth available in a communication path between the transmitting device and the receiving device, based on: a mathematical model constructed by representing a relation between the available bandwidth and the transmission rate by a dynamic model including a mobile body that can move in a preset moving direction and an elastic body that transforms in the moving direction by a movement amount of movement of the mobile body in the moving direction; and the acquired transmission rate.

With the configurations described above, the present invention can estimate, with high accuracy, an available bandwidth when the transmission rate relating to self-traffic is changed.

BRIEF DESCRIPTION OF DRAWINGS

FIG. 1 is a diagram showing a schematic configuration of a content delivery system according to a first exemplary embodiment of the present invention;

FIG. 2 is a block diagram schematically showing a function of the content delivery system according to the first exemplary embodiment of the present invention;

EXEMPLARY EMBODIMENTS

Figure 3:
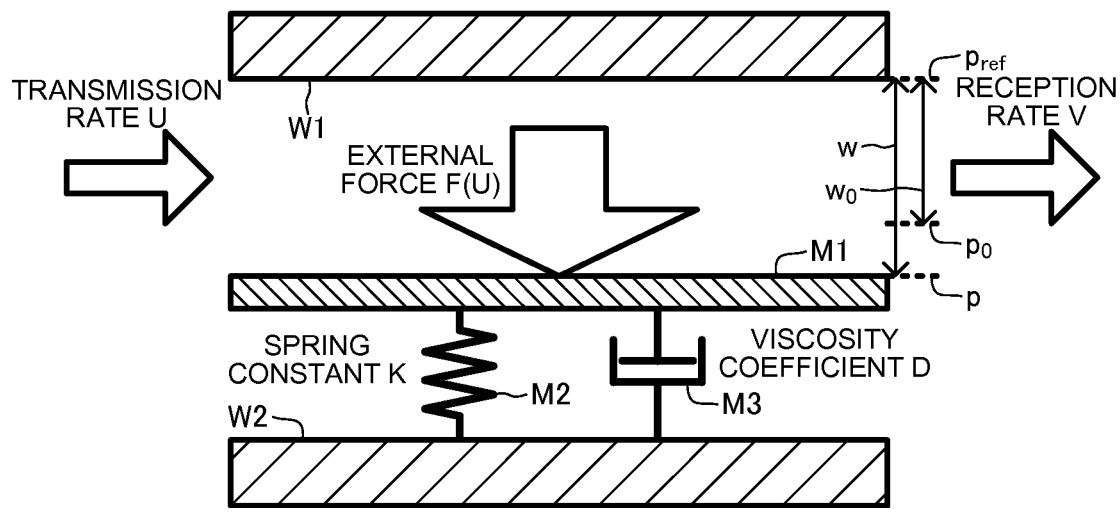
FIG. 3 is an explanation view conceptually showing a dynamic model according to the first exemplary embodiment of the present invention.

Below, exemplary embodiments of an available bandwidth estimating device, an available bandwidth estimating method and a program according to the present invention will be described with reference to FIGS. 1 to 12.

First Exemplary Embodiment

As shown in FIG. 1, a content delivery system 1 according to a first exemplary embodiment includes a transmitting device (an available bandwidth estimating device) 100 and a receiving device 200. The transmitting device 100 and the receiving device 200 are connected so as to be capable of communicating with each other via a communication network NW configuring the IP (Internet Protocol) network.

The transmitting device 100 is a server device. The transmitting device 100 is equipped with a central processing unit (CPU) and a storage device (a memory and a hard disk drive (HDD)), which are not shown in the drawing. The transmitting device 100 is configured to realize a function described later by execution of a program stored in the storage device by the CPU.

The receiving device 200 is a personal computer. The receiving device 200 may be a mobile phone terminal, a PHS (Personal Handyphone System), a PDA (Personal Data Assistance, Personal Digital Assistant), a car navigation terminal, a game terminal, or the like. The receiving device 200 is equipped with a CPU, a storage device (a memory and an HDD), an input device (a keyboard, a mouse, and the like) and an output device (a display, or the like), which are not shown in the drawing.

The receiving device 200 is configured to realize a function described later by execution of a program stored in the storage device by the CPU.

FIG. 2 is a block diagram showing a function of the content delivery system 1 configured as described above.

The function of the transmitting device 100 includes a data transmitting part 101, a transmission rate acquiring part (a transmission rate acquiring means) 102, a reception rate acquiring part (a reception rate acquiring means) 103, a model parameter estimating part (a model parameter estimating means) 104, an available bandwidth estimating part (an available bandwidth estimating means) 105, and a reception characteristic information estimating part (a reception characteristic information estimating means) 106.

Further, the function of the receiving device 200 includes a data receiving part 201 and a reception information transmitting part 202.

The data transmitting part 101 transmits data to the receiving device 200. In this exemplary embodiment, the data transmitting part 101 transmits multimedia data representing video or sound. The data transmitting part 101 transmits data in compliance with RTP (Real-time Transport Protocol).

The data transmitting part 101 may transmit data other than multimedia data (e.g., probe data: data itself does not have any meaning). Moreover, the data transmitting part 101 may transmit data in compliance with a communication protocol other than RTP. It is preferred that the data transmitting part 101 transmits data in compliance with UDP (User Datagram Protocol)/IP or TCP/IP.

The transmission rate acquiring part 102 calculates (acquires) a transmission rate, which is the amount (the size) of data transmitted by the data transmitting part 101 to the receiving device 200 per unit time, every time a preset operation period h elapses.

The data receiving part 201 receives data transmitted by the transmitting device 100.

The reception information transmitting part 202 extracts reception information relating to data transmitted by the transmitting device 100, from among reception information relating to all data received by the data receiving part 201.

Reception information has only to include information that enables calculation of a reception rate, which is the amount of data received by the receiving device 200 from the transmitting device 100 per unit time. In this exemplary embodiment, reception information is a pair of: time when the reception information has been acquired (sampled); and the amount of data received within a period from previous time when the reception information has been acquired to present time. Reception information may include time when the reception information has been acquired, the maximum value of a sequence number included in the received data, and the amount of data loss.

The data receiving part 201 transmits the extracted reception information to the transmitting device 100 every time the operation period h elapses. In this exemplary embodiment, the data receiving part 201 transmits reception information in compliance with RTCP (RTP Control Protocol). Furthermore, the data receiving part 201 transmits the reception information in the form of an RTCP RR packet (Receiver Report Packet).

The reception rate acquiring part 103 receives reception information from the receiving device 200. The reception rate acquiring part 103 calculates (acquires) a reception rate, which is the amount of data received by the receiving device 200 from the transmitting device 100 per unit time, based on the received reception information.

The model parameter estimating part 104 estimates a model parameter based on a transmission rate acquired by the transmission rate acquiring part 102, a reception rate acquired by the reception rate acquiring part 103, and a mathematical model. A model parameter is a parameter for specifying a mathematical model, and includes a force-free distance, an elastic modulus, and a viscosity coefficient.

Below, a mathematical model will be described.

As mentioned above, with an available bandwidth estimating device configured to calculate a value as the result of subtracting an already used communication bandwidth from a physical bandwidth for each of sections configuring a communication path and estimate the minimum value of the calculated values as an available bandwidth in the communication path, it is impossible to highly accurately estimate an available bandwidth because a change of a transmission rate relating to cross traffic in accordance with a change of a transmission rate relating to self-traffic is not taken into consideration.

Actually, as a transmission rate relating to self-traffic (the flow of self-traffic) becomes large, a data loss ratio and delay time relating to cross traffic increase. Consequently, a transmission rate relating to cross traffic (the flow of cross traffic) decreases. As a result, a communication bandwidth that is available for communication relating to self-traffic (i.e., an available bandwidth) increases.

On the other hand, as the flow of self-traffic becomes small, a data loss ratio and delay time relating to cross traffic decrease. Consequently, the flow of cross traffic increases. As a result, a communication bandwidth that is available for communication relating to self-traffic (i.e., an available bandwidth) decreases.

Thus, it can be said that a qualitative relation between the flow of self-traffic and the flow of cross traffic is a relation of thrusting the flows with each other (decreasing one when the other increases, and increasing one when the other decreases).

Then, by representing a relation between an available bandwidth and a transmission rate by using a dynamic model (a viscoelastic model) including a mobile body M1, a spring M2 as an elastic body (an elastic element) and a dashpot M3 as a viscous body (a viscous element) shown in FIG. 3, a mathematical model will be constructed.

This dynamic model is a model in which data transmitted from the transmitting device 100 to the receiving device 200 is simulated by a fluid flowing in a passage zoned by a wall face W1 and the mobile body M1. The mobile body M1 is a plate-like body that is placed within the passage and movable in a moving direction set in advance (in the vertical direction in FIG. 3).

The spring M2 is a coil spring having a spring constant (an elastic modulus) K. The spring M2 has one end fixed to the mobile body M1 and the other end fixed to the wall face W2. With such a configuration, the spring M2 transforms, by the amount of movement of the mobile body M1 in a moving direction, in the moving direction.

The dashpot M3 has a viscosity coefficient D. The dashpot M3 has one end fixed to the mobile body M1 and the other end fixed to the wall face W2. With such a configuration, the dashpot M3 delays the movement in the moving direction of the mobile body M1 due to external force applied to the mobile body M1.

In this exemplary embodiment, both the spring constant K and the viscosity coefficient D are constant values (have a linear characteristic). The spring constant K and/or the viscosity coefficient may have a nonlinear characteristic.

The dynamic model is a model in which it is assumed that external force applied to the mobile body M1 in the moving direction by a fluid corresponding to data transmitted at a transmission rate u (unit is [bps]) from the transmitting device 100 to the receiving device 200 has a magnitude f(u) corresponding to the transmission rate u, and it is assumed that a distance in the moving direction between a reference position $p_{ref}$ set in advance (in this exemplary embodiment, a position of the wall face W1) and a position p of the mobile body M1 is an available bandwidth w (unit is [bps]). That is to say, this dynamic model is a model representing a relation between the available bandwidth and the transmission rate.

Further, in this dynamic model, in a case that the mobile body M1 is located in a position $p_0$ (a force-free position) away from the reference position $p_{ref}$ in the moving direction by a distance (a force-free distance) $w_0$, the spring M2 does not generate an elastic force (a restoring force). Moreover, an elastic force generated by the spring M2 has a magnitude of a value as the result of multiplying a movement amount $w-w_0$ of the mobile body M1 from the force-free position $p_0$ by the elastic modulus K that is a proportionality factor, and works in the opposite direction to a direction in which the mobile body M1 moves from the mobile body M1.

In addition, in this dynamic model, when the mobile body M1 is still in the moving direction (speed is 0), the dashpot M3 does not generate resistance force. Moreover, resistance force generated by the dashpot M3 has a magnitude of a value as the result of multiplying a movement speed of the mobile body M1 in the moving direction by the viscosity coefficient D that is a proportionality factor, and works in the opposite direction to the direction that the mobile body M1 moves.

In this dynamic model, an equation governing a motion of the mobile body M1 is written as an equation 3. A term dw/dt denotes the derivative of the distance (i.e., the available bandwidth) w in the moving direction between the reference position $p_{ref}$ and the position p of the mobile body M1 with respect to time t.

$$D\frac{dw}{dt} + K(w - w_0) = f(u) \qquad \text{[Equation 3]}$$

Further, a reception rate v (unit is [bps]) coincides with the available bandwidth w when the transmission rate u is larger than the available bandwidth w and, on the other hand, coincides with the transmission rate u when the transmission rate u is equal to or less than the available bandwidth w, as shown by an equation 4.

$$\begin{cases} v = w & \text{where } u > w \\ v = u & \text{where } u \leq w \end{cases} \qquad \text{[Equation 4]}$$

It can be thought that the spring constant K in this viscoelastic model represents "being hard to thrust" of cross traffic. Moreover, it can be thought that the viscosity coefficient D represents the "degree of viscosity" or "weak response" of cross traffic.

As the dynamic model, it is possible to use another model. For example, a model that also takes the inertia force of the mobile body M1 into consideration can be employed as the dynamic model. By the inertial force of the mobile body M1, it is possible to represent a change that a transmission rate relating to cross traffic overshoots. In this dynamic model, an equation governing a motion of the mobile body M1 is written as an equation 5. In the equation, M denotes the mass of the mobile body M1. Moreover, $d^2w/dt^2$ denotes the second derivative of the distance (the available bandwidth) w in the moving direction between the reference position $p_{ref}$ and the position p of the mobile body M1 with respect to time t.

$$M\frac{d^2w}{dt^2} + D\frac{dw}{dt} + K(w - w_0) = f(u) \qquad \text{[Equation 5]}$$

Figure 4:
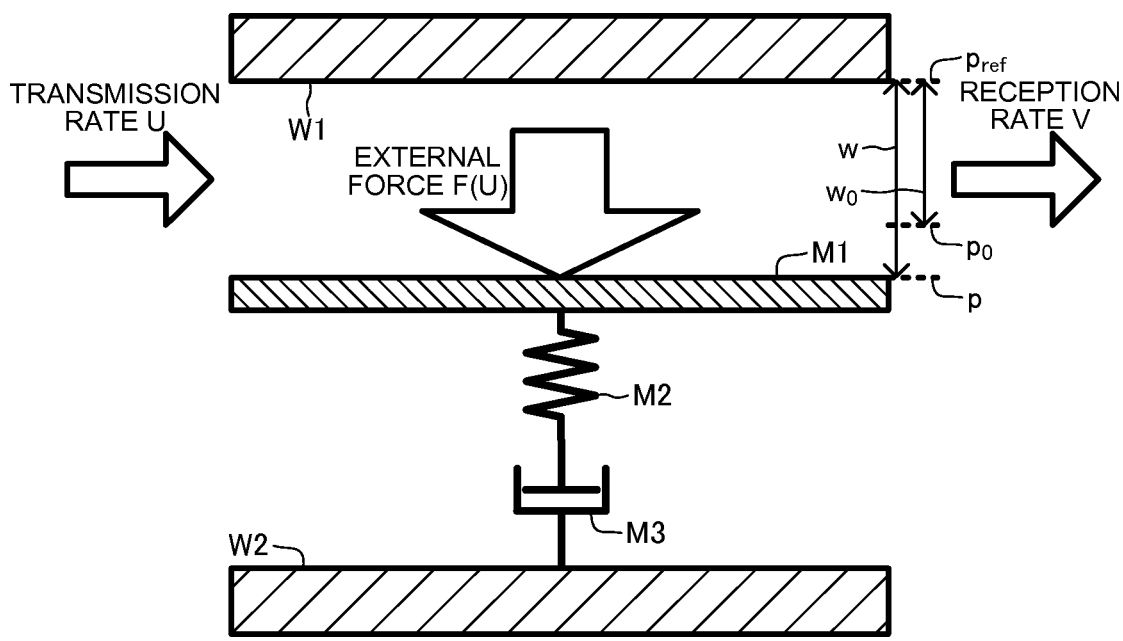
FIG. 4 is an explanation view conceptually showing a dynamic model according to a modified example of the first exemplary embodiment of the present invention.

As mentioned above, the viscoelastic model in which the spring M2 and the dashpot M3 are connected to the mobile body M1 in parallel is called the Kelvin-Voigt model. Moreover, as shown in FIG. 4, the dynamic model may be a viscoelastic model in which the spring M2 and the dashpot M3 are connected to the mobile body M1 in series. This viscoelastic model is called the Maxwell model.

Figure 5:
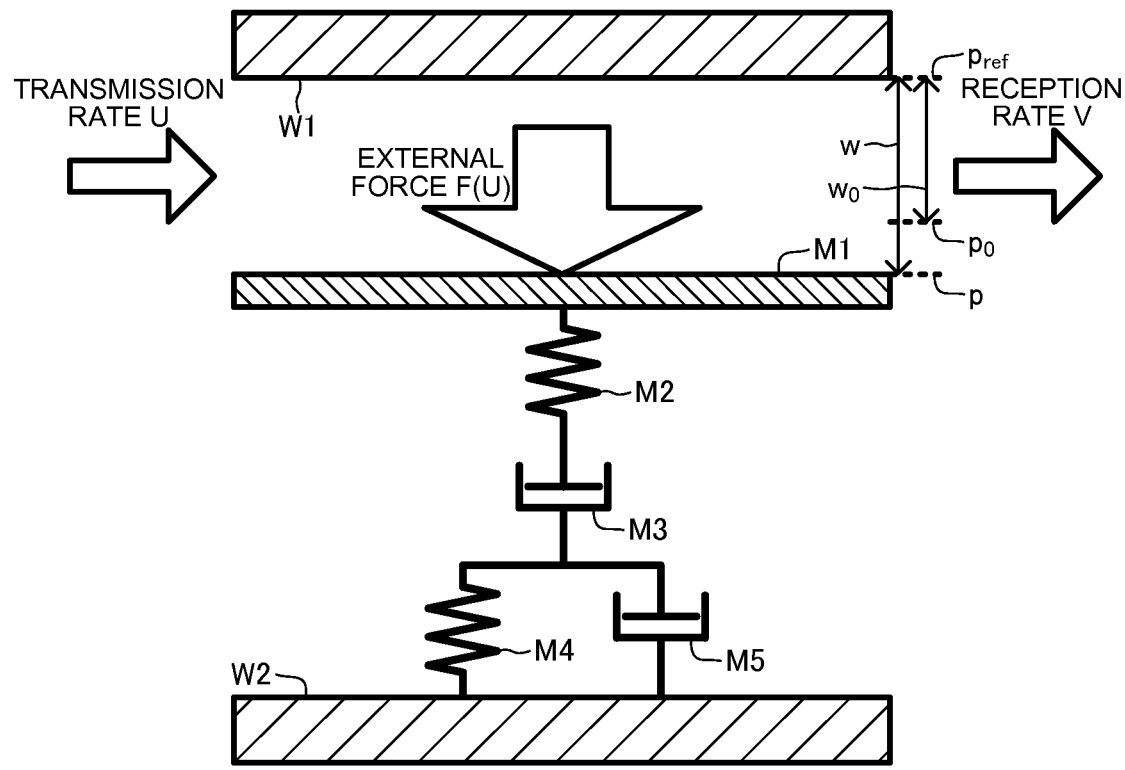
FIG. 5 is an explanation view conceptually showing a dynamic model according to a modified example of the first exemplary embodiment of the present invention.

Further, as shown in FIG. 5, the dynamic model may be a viscoelastic model (a four-element model) including a plurality of (in this example embodiment, two) springs M2 and M4 and a plurality of (in this exemplary embodiment, two) dashpots M3 and M5. In this exemplary embodiment, the spring M2 and the dashpot M3 are connected in series to the mobile body M1, and the spring M4 and the dashpot M5 are connected in parallel to the spring M4 and the dashpot M5.

Further, an equation governing a motion of the mobile body M1 in the dynamic model may include a term including the third derivative (the jerk) of the distance (the available bandwidth) w in the moving direction between the reference position $p_{ref}$ and the position p of the mobile body M1 with respect to time t, or may include a term including the third or higher derivative.

As mentioned above, the model parameter estimating part 104 estimates a model parameter based on the mathematical model formed by the equations 4 and 5, a transmission rate acquired by the transmission rate acquiring part 102, and a reception rate acquired by the reception rate acquiring part 103. A model parameter includes the force-free distance $w_0$, the elastic modulus K, and the viscosity coefficient D.

In this exemplary embodiment, the model parameter estimating part 104 estimates a model parameter by using the least squares method. Here, for convenience, equations 6 and 7, which linearly approximate the equations 3 and 4, will be used as a mathematical model.

$$D\frac{dw}{dt} + K(w - w_0) = u \qquad \text{[Equation 6]}$$

$$v = w \qquad \text{[Equation 7]}$$

The reception rate acquiring part 103 calculates a reception rate every time the operation period h elapses. Then, the equation 6 will be rewritten to a difference equation. In this exemplary embodiment, as shown by an equation 8, the operation period (a sampling interval) h is a time interval (a time step), and a backward difference is used.

$$\frac{D}{2h}(3w(k) - 4w(k-1) + w(k-2)) + K(w(k) - w_0) = u(k) \qquad \text{[Equation 8]}$$

Here, by solving the equation 8 for w(k), an equation 9 is obtained.

$$w(k) = \frac{1}{3D + 2hK}\{D(4w(k-1) - w(k-2)) + 2hu(k) + 2hKw_0\} \qquad \text{[Equation 9]}$$

From the equation 9, φ(k) and θ will be defined as shown by equations 10 and 11. Here, "$X^T$" denotes the transposed matrix of a matrix X.

$$\phi(k) = [4w(k-1) - w(k-2), \ u(k), \ 1]^T \qquad \text{[Equation 10]}$$

$$\theta = \frac{1}{3D + 2hK}[D, \ 2h, \ 2hKw_0]^T \qquad \text{[Equation 11]}$$

The equation 9, which is a difference equation, can be represented as shown by an equation 12 using φ(k) and θ.

$$w(k) = \phi(k)^T \theta \qquad \text{[Equation 12]}$$

According to the equation 12, it is possible to apply the least squares method to θ. When letting θ estimated by the least squares method be $θ_e$, it is possible to obtain $θ_e$ by an equation 13. Here, "Σ(X)" denotes a value as the result of accumulating X regarding k (i.e., the sum of X for every operation period h). Moreover, "X$^{-1}$" denotes the inverse matrix of the matrix X.

$$\theta_e = \left[\sum (\phi(k)\phi(k)^T)\right]^{-1}\left[\sum (\phi(k)w(k))\right] \quad \text{[Equation 13]}$$

Then, when letting the estimated $\theta_e$ be $\theta_e[a,b,c]$, it is possible to obtain the spring constant K, the viscosity coefficient D and the force-free distance $w_0$ by an equation 14, an equation 15 and an equation 16, respectively.

$$D = \frac{2ha}{b} \quad \text{[Equation 14]}$$

$$K = \frac{1-3a}{b} \quad \text{[Equation 15]}$$

$$w_0 = \frac{c}{1-3a} \quad \text{[Equation 16]}$$

The available bandwidth estimating part 105 estimates the available bandwidth w based on the mathematical model, the model parameter estimated by the model parameter estimating part 104, and the transmission rate acquired by the transmission rate acquiring part 102.

The analytical solution of the equation 6 is obtained as shown by an equation 17. Therefore, the available bandwidth estimating part 105 estimates the available bandwidth w [bps] at any time t, based on the model parameter estimated by the model parameter estimating part 104, the transmission rate u acquired by the transmission rate acquiring part 102 and an equation 17. The available bandwidth estimating part 105 also can estimate the available bandwidth w [bps] for a transmission rate (i.e., a virtual transmission rate) other than the transmission rate acquired by the transmission rate acquiring part 102.

$$w = w_0 + \frac{u}{K}(1 - e^{-\frac{Kt}{D}}) \quad \text{[Equation 17]}$$

In a case that it is impossible to obtain the analytical solution based on the mathematical model, the available bandwidth estimating part 105 can estimate the available bandwidth w by numerically solving the mathematical model.

The reception characteristic information estimating part 106 estimates reception characteristic information representing a characteristic of reception of data by the receiving device 200, based on the available bandwidth w estimated by the available bandwidth estimating part 105 and the transmission rate u acquired by the transmission rate acquiring part 102. In this exemplary embodiment, reception characteristic information is information representing a reception rate, a data loss ratio, and a data delay time.

A data loss ratio is the ratio of the amount of data lost in the communication network NW among data transmitted by the transmitting device 100 to the total amount of the data transmitted by the transmitting device 100. A data delay time is a time from a moment of transmission of data by the transmitting device 100 to a moment of reception of the data by the receiving device 200.

From the equation 7, the reception rate v [bps] is equal to the available bandwidth w. Therefore, the reception characteristic information estimating part 106 estimates the available bandwidth w estimated by the available bandwidth estimating part 105 as the reception rate v.

Next, estimation of a data loss ratio will be described.

The amount q(t) (unit is [bit]) of data that has not been received by the data receiving part 201 of the receiving device 200 yet among data that has been transmitted by the data transmitting part 101 of the transmitting device 100 at certain time t [s] (i.e., a network accumulation data amount) is represented as shown by an equation 18.

$$q(t) = \int_0^t \{u(\tau) - v(\tau)\}d\tau \quad \text{[Equation 18]}$$

Most of network nodes, such as a router, configuring the communication network NW are provided with a function of, when the amount (i.e., an unprocessed data amount) of data that remains in the own device (data that is stored in a buffer of the own device) increases, disposing of the data. Accordingly, since the amount of unprocessed data remaining in the network nodes becomes large when the network accumulation data amount becomes large, data loss occurs.

In a case that a threshold of the network accumulation data amount in which data loss occurs is $q_{th}$, data corresponding to a portion exceeding the threshold $q_{th}$ of the network accumulation data amount q [bit] will be lost in the communication network NW. When letting the total amount of data lost at time t [s] (i.e., a lost data amount) be $q_l(t)$ [bit], it is possible to rewrite the equation 18 to an equation 19, which takes occurrence of data loss into consideration.

$$q(t) = \int_0^t \{u(\tau) - v(\tau)\}d\tau - q_l(t) \quad \text{[Equation 19]}$$

Here, the lost data amount $q_l(t)$ is a function defined so as to let the network accumulation data amount q(t) be equal to or less than the threshold $q_{th}$. When a set D of time sections is defined as shown by an equation 20, the lost data amount $q_l(t)$ is calculated from an equation 21. Here, $\int_D X(\tau)d\tau$ denotes the integral of $X(\tau)$ over the time sections D.

$$D = \{t | q(t) \geq q_{th} \text{ and } u(t) > v(t)\} \quad \text{[Equation 20]}$$

$$q_l(t) = \int_D \{u(\tau) - v(\tau)\}d\tau \quad \text{[Equation 21]}$$

In a case that the threshold $q_{th}$ is known, it is possible to calculate the lost data amount $q_l(t)$ as described above. On the other hand, in a case that the threshold $q_{th}$ is unknown, the lost data amount $q_l$ may be calculated with a threshold $q_{th}=0$. Moreover, a data loss ratio is the ratio of the amount of data lost in the communication network NW to the amount of data transmitted by the transmitting device 100. Therefore, a data loss ratio p $[t_1,t_2]$ at a certain time section $[t_1,t_2]$ can be calculated as shown by an equation 22.

$$p[t_1, t_2] = \frac{q_l(t_2) - q_l(t_1)}{\int_{t_1}^{t_2} u(\tau)d\tau} \quad \text{[Equation 22]}$$

In this exemplary embodiment, the reception characteristic information estimating part 106 estimates the data loss ratio p based on the equation 22. When letting the time section $[t_1,t_2]$ be considerably small, it is possible to calculate a data loss ratio p(t) at certain time t [s] as shown by an equation 23. Therefore, the reception characteristic information estimating part 106 may estimate the data loss ratio p based on the equation 23.

$$p(t) = \frac{u-v}{u} = 1 - \frac{u}{v} \quad \text{[Equation 23]}$$

Next, estimation of a data delay time will be described. A data delay time is a time required before data transmitted by the data transmitting part 101 of the transmitting device 100 is received by the data receiving part 201 of the receiving device 200. A data delay time is equal to a time required before the network accumulation data amount of data is all transferred to the receiving device 200. Therefore, given that a data delay time is $t_d$ [s], a relation shown by an equation 24 is satisfied.

$$q(t) = \int_t^{t+t_d} v(\tau) d\tau \qquad \text{[Equation 24]}$$

Here, when the reception rate v(t) is approximated as being constant, the data delay time $t_d$ [s] can be obtained from an equation 25. In this exemplary embodiment, the reception characteristic information estimating part 106 estimates the data delay time $t_d$ based on an equation 25.

$$t_d = \frac{q(t)}{v(t)} \qquad \text{[Equation 25]}$$

Thus, the reception characteristic information estimating part 106 estimates reception characteristic information.

Next, an operation of the content delivery system 1 configured as described above will be explained with reference to FIGS. 6 to 9.

Figure 6:
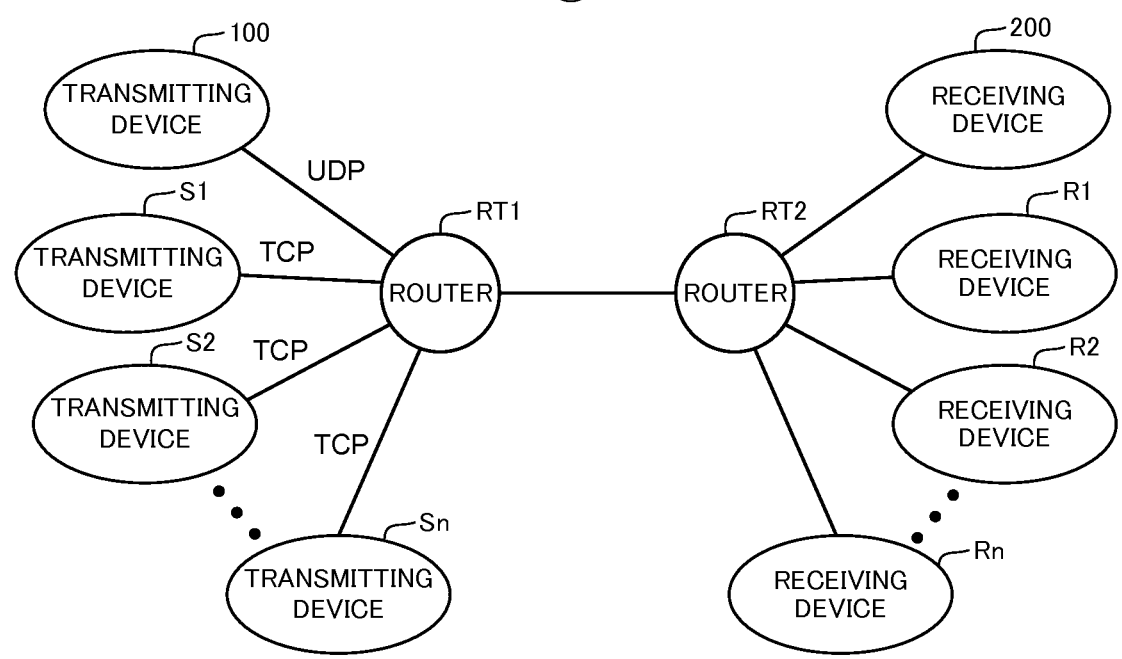
FIG. 6 is an explanation view conceptually showing a communication status of a communication network according to the first exemplary embodiment of the present invention.

FIG. 6 is an explanation view conceptually showing a communication status of the communication network NW.

A communication path between the transmitting device 100 and the receiving device 200 is through a router RT1 and a router RT2. The upper limit value of a communication bandwidth between the router RT1 and the router RT2 (i.e., a physical bandwidth) is 10 [Mbps]. A data delay time relating to communication between the router RT1 and the router RT2 is 5 [ms]. A threshold of a network accumulation data amount relating to communication between the router RT1 and the router RT2 is an amount corresponding to 100 packets.

The transmitting device 100 transmits data to the receiving device 200 in compliance with UDP.

Further, communication relating to cross traffic through the router RT1 and the router RT2 exists. Communication relating to cross traffic is performed between transmitting devices S1 to Sn and receiving devices R1 to Rn, respectively. Communication relating to cross traffic is communication compliant with TCP. In this exemplary embodiment, communication relating to cross traffic is performed at all times.

The upper limit value of a communication bandwidth between each of the transmitting devices 100, S1 to Sn and the router RT1 (i.e., a physical bandwidth) is 100 [Mbps]. A data delay time relating to communication between each of the transmitting devices 100, S1 to Sn and the router RT1 is 4 [ms]. A threshold of a network accumulation data amount relating to communication between each of the transmitting devices 100, S1 to Sn and the router RT1 is an amount corresponding to 10,000 packets.

Likewise, the upper limit value of a communication bandwidth between each of the receiving devices 200, R1 to Rn and the router RT2 (i.e., a physical bandwidth) is 100 [Mbps]. A data delay time relating to communication between each of the receiving devices 200, R1 to Rn and the router RT2 is 4 [ms]. A threshold of a network accumulation data amount relating to communication between each of the receiving devices 200, R1 to Rn and the router RT2 is an amount corresponding to 10,000 packets.

Figure 7:
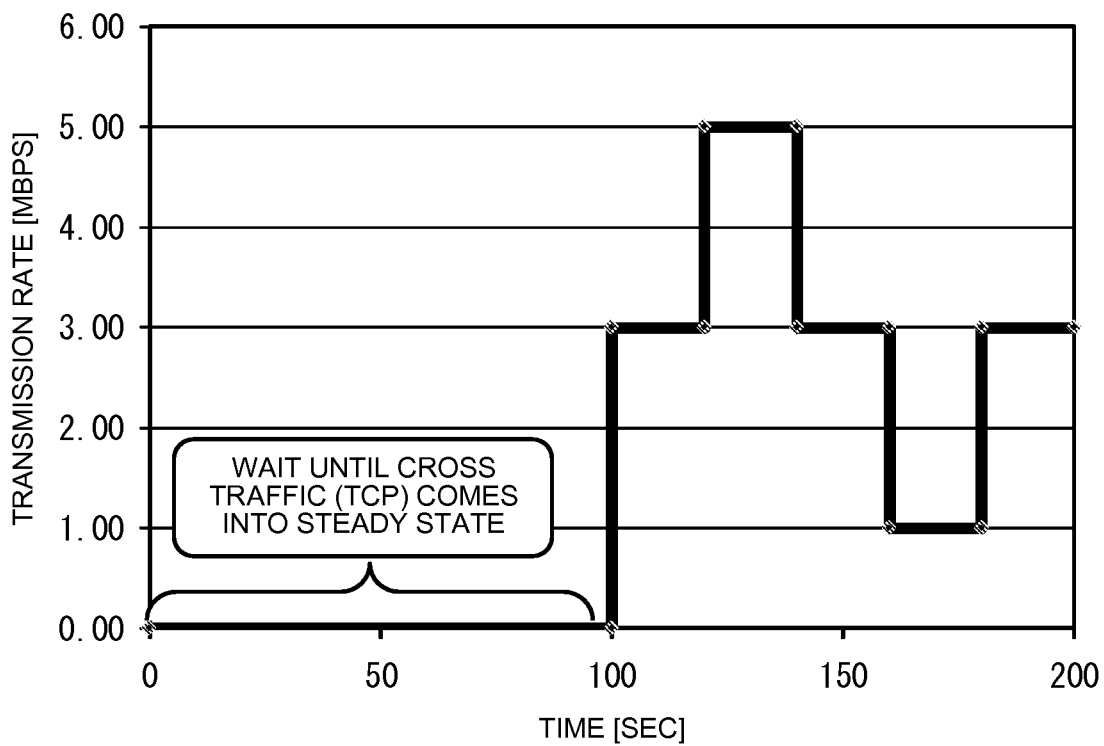
FIG. 7 is a graph showing a change of a transmission rate.

In this exemplary embodiment, as shown in FIG. 7, the transmitting device 100 transmits data to the receiving device 200 while changing a transmission rate. To be specific, the transmitting device 100 does not transmit data because the state of communication relating to cross traffic varies during a period of 0 to 100 [s] (the transmitting device 100 waits until the state of communication relating to cross traffic comes into a steady state).

Then, the transmitting device 100 sets the transmission rate to 3 [Mbps] during a period of 100 to 120 [s], sets the transmission rate to 5 [Mbps] during a period of 120 to 140 [s], sets the transmission rate to 3 [Mbps] during a period of 140 to 160 [Mbps], sets the transmission rate to 1 [Mbps] during a period of 160 to 180 [s], and sets the transmission rate to 3 [Mbps] during a period of 180 to 200 [s].

Figure 8:
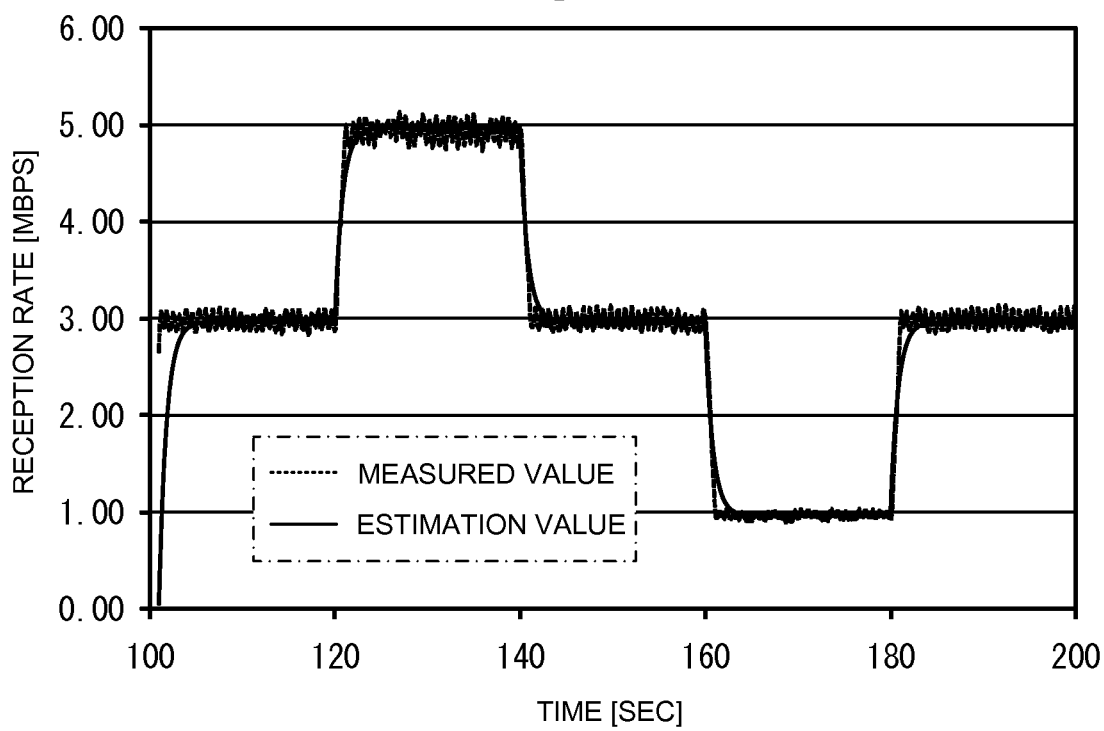
FIG. 8 is a graph showing a change of a reception rate in a case that the number of cross traffic is 10.

The transmitting device 100 calculates a reception rate based on reception information received from the receiving device 200. A dotted line in FIG. 8 is a graph showing reception rates calculated by the transmitting device 100 in a case that the number of cross traffic is 10. Moreover, the transmitting device 100 calculates a transmission rate. As described above, the transmitting device 100 estimates a model parameter by using the least squares method based on the mathematical models shown in the equations 6 and 7, the transmission rate acquired by the transmission rate acquiring part 102, and the reception rate acquired by the reception rate acquiring part 103.

Figures 9, 10:
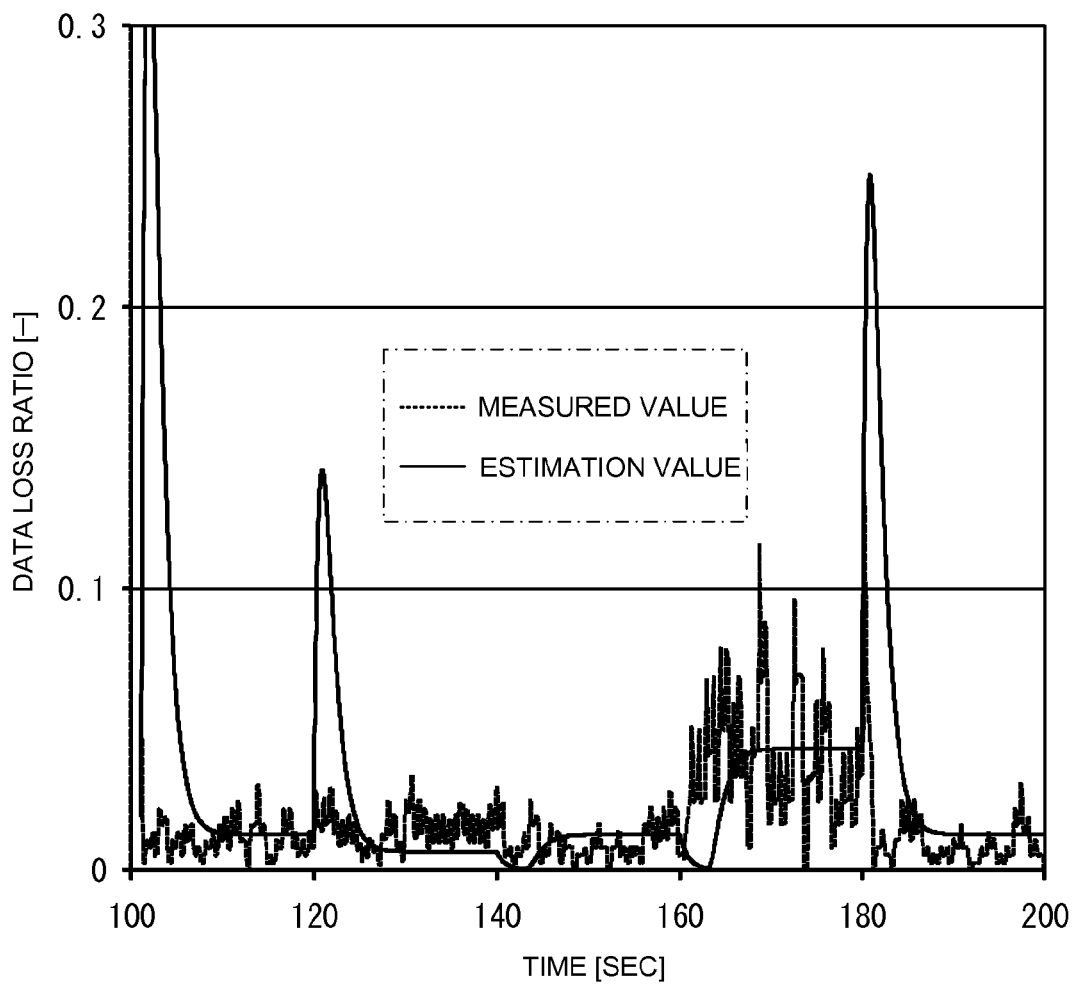
FIG. 9 is a table showing model parameters estimated by a transmitting device in cases that the numbers of cross traffic are 1, 2, 3, 5, 7, 10, 15, 20 and 30, respectively.
FIG. 10 is a graph showing a change of a data loss ratio in a case that the number of cross traffic is 10.

FIG. 9 is a table showing model parameters estimated by the transmitting device 100 in each of cases that the numbers of cross traffic are 1, 2, 3, 5, 7, 10, 15, 20 and 30.

Then, the transmitting device 100 estimates the available bandwidth w based on the estimated model parameters, the mathematical models, and the transmission rate acquired by the transmission rate acquiring part 102. Next, the transmitting device 100 estimates the reception rate v based on the estimated available bandwidth w. Moreover, the transmitting device 100 estimates the data loss ratio p and the data delay time $t_d$ based on the estimated reception rate v and the acquired transmission rate.

A solid line in FIG. 8 is a graph showing reception rates estimated by the transmitting device 100 in a case that the number of cross traffic is 10. As shown in FIG. 8, it appears that the transmitting device 100 estimates a reception rate with high accuracy.

Further, a solid line in FIG. 10 is a graph showing data loss ratios estimated by the transmitting device 100 in a case that the number of cross traffic is 10. A dotted line in FIG. 10 is a graph showing measured values of the data loss ratios in a case that the number of cross traffic is 10. The data loss ratio is estimated as a value larger than the measured value because estimated with $q_{th}$=0. However, it can be said that variation of the data loss ratio at the time of change of the transmission rate is well estimated.

As described above, with the transmitting device 100 according to the first exemplary embodiment, it is possible to estimate, with high accuracy, an available bandwidth when a transmission rate relating to self-traffic is changed. As a result, it is possible to estimate, with high accuracy, reception characteristic information representing the characteristic (e.g., a reception rate, a data loss ratio, a data delay time, etc.) of reception of data by the receiving device 200.

Further, in the first exemplary embodiment, the dynamic model includes the dashpot M3 as a viscous body which delays movement in a moving direction of the mobile body M1 due to external force applied to the mobile body M1. A delay time is required from change of a transmission rate relating to self-traffic by the transmitting device 100 to change of a transmission rate relating to cross traffic by another transmitting device. This delay time is well represented by a resistance force of the viscous body. Therefore, with the transmitting device 100 according to the first exemplary embodiment, it is possible to estimate, with high accuracy, an available bandwidth in a case that a transmission rate relating to self-traffic is changed.

In a modified example of the first exemplary embodiment, the transmitting device 100 may be configured to determine a transmission rate based on estimated reception characteristic information and transmit data at the determined transmission rate to the receiving device 200.

Further, in a modified example of the first exemplary embodiment, the model parameter estimating part 104 may be configured to estimate a model parameter by using a method other than the least squares method. For example, it is preferred that the model parameter estimating part 104 selects a plurality of model parameters different from each other and estimates an optimum model parameter from among the selected model parameters. To be specific, for each model parameter, the model parameter estimating part 104 estimates an available bandwidth based on the model parameter, the mathematical model and the transmission rate acquired by the transmission rate acquiring part 102, and estimates a reception rate based on the estimated available bandwidth. Moreover, the model parameter estimating part 104 estimates a model parameter having the highest degree of coincidence between the estimated reception rate and the reception rate acquired by the reception rate acquiring part 103, as an optimum model parameter.

Second Exemplary Embodiment

Next, a content delivery system according to a second exemplary embodiment of the present invention will be described. The content delivery system according to the second exemplary embodiment is different from the content delivery system according to the first exemplary embodiment in that the transmitting device changes redundancy relating to an error correction process based on a data loss ratio. Therefore, a description will be made focusing on a different point.

Figure 11:
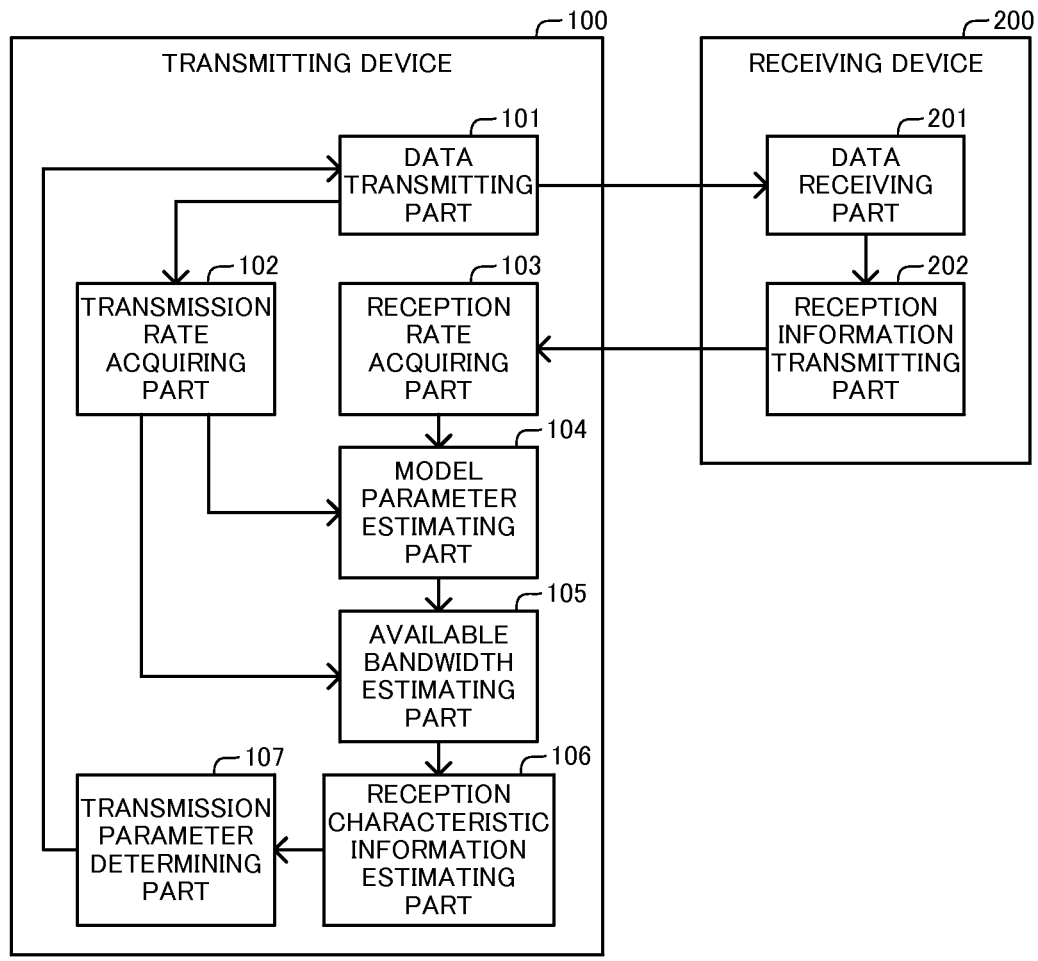
FIG. 11 is a block diagram schematically showing a function of a content delivery system according to a second exemplary embodiment of the present invention.

As shown in FIG. 11, a function of the transmitting device 100 according to the second exemplary embodiment includes a transmission parameter determining part (a transmission parameter determining means) 107 in addition to the function of the first exemplary embodiment.

The transmission parameter determining part 107 determines a transmission rate and redundancy (in this exemplary embodiment FEC (Forward Error Correction) redundancy) for transmitting data to the receiving device 200 based on a data loss ratio estimated by the reception characteristic information estimating part 106.

The data transmitting part 101 encodes transmission information to generate data having the redundancy determined by the transmission parameter determining part 107 so that the receiving device 200 can execute an error correction process (in this exemplary embodiment, a forward error correction process). The data transmitting part 101 transmits the generated data to the receiving device 200 at a transmission rate determined by the transmission parameter determining part 107.

The data receiving part 201 acquires the transmission information by executing the error correction process based on the data received from the transmitting device 100. In this exemplary embodiment, the content delivery system 1 is configured to execute an error correction process using Reed-Solomon codes. Alternatively, the content delivery system 1 may be configured to execute an error correction process using codes other than Reed-Solomon codes.

Here, the transmission parameter determining part 107 will be described in more detail.

When the amount of data (net data) corresponding to the transmission information that is the basis of data transmitted by the transmitting device 100 to the receiving device 200 per unit time among the data (i.e., a net transmission rate) is $u_n$ [bps] and the amount of a portion (redundant data) other than the net data among the data transmitted by the transmitting device 100 to the receiving device 200 per unit time (i.e., a redundant transmission rate) is $u_r$ [bps], a relation shown by an equation 26 is satisfied.

$$u = u_n + u_r \quad \text{[Equation 26]}$$

Redundancy $d_r$ is defined as shown by an equation 27 as a ratio of the redundant transmission rate $u_r$ to the transmission rate u.

$$d_r = \frac{u_r}{u} \quad \text{[Equation 27]}$$

The upper limit value of a data loss ratio that allows restoration of the transmission information by execution of the error correction process varies with the redundancy $d_r$. Here, the average value (an average data loss ratio) of the data loss ratio that allows restoration of the transmission information will be denoted by $r_c(d_r)$.

In this case, by determining the redundancy $d_r$ so as to satisfy $r_c(d_r) \geq p(t)$ based on the data loss ratio p(t) estimated by the reception characteristic information estimating part 106, it is possible to cause the receiving device 200 to restore the transmission information even when data loss occurs.

The data loss ratio p(t) varies with time. However, it is difficult to change the redundancy $d_r$ in accordance with the data loss ratio p(t) within a relatively short time period. Thus, the transmission parameter determining part 107 calculates an average value $p_a$ (an average data loss ratio) of a data loss ratio in a preset change cycle. Then, the transmission parameter determining part 107 determines the redundancy $d_r$ so as to satisfy an equation 28. The transmission parameter determining part 107 may be configured to use a movement average value as the average data loss ratio $p_a$.

$$r_c(d_r) \geq p_a \quad \text{[Equation 28]}$$

Thus, the transmission parameter determining part 107 determines the redundancy $d_r$ of data so that the receiving device 200 can restore the transmission information by executing the error correction process based on received data in a case that part of data is lost in the communication network NW at the data loss ratio estimated by the reception characteristic information estimating part 107.

According to this, even when data loss occurs, it is possible to restore transmission information (in this exemplary embodiment, multimedia data) based on the data received by the receiving device 200. As a result, it is possible to securely prevent decrease of the quality of transmission information acquired by the receiving device 200.

Furthermore, the transmission parameter determining part 107 determines a pair of the transmission rate u and the redundancy $d_r$ so as to maximize the net transmission rate $u_n$ (i.e., the amount of transmission information transmitted per unit time) within a range satisfying the equation 28.

Accordingly, it is possible to maximize the amount of transmission information transmitted per unit time within a rage that the receiving device 200 can restore the transmission information by executing the error correction process based on received data.

As described above, with the transmitting device 100 according to the second exemplary embodiment, it is possible to estimate, with high accuracy, an available bandwidth in a case that a transmission rate relating to self-traffic is changed. As a result, it is possible to properly set a transmission rate relating to self-traffic based on the estimated available bandwidth.

In a case that the transmitting device 100 is configured to transmit any of transmission information encoded at a plurality of media rates different from each other (encoding rates, e.g., 384 [kbps], 1 [Mbps]) to the receiving device 200, the transmitting device 100 may be configured to determine a pair of the transmission rate u and the redundancy $d_r$ so as to maximize the media rate in a range satisfying the equation 28. In this case, it is possible to make the quality of reception information received by the receiving device 200 high.

Third Exemplary Embodiment

Figure 12:
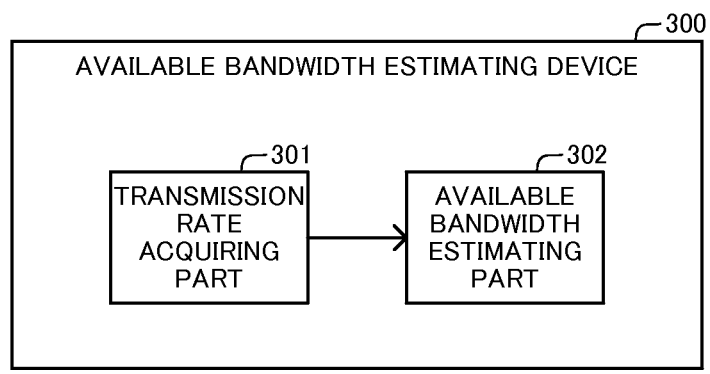
FIG. 12 is a block diagram schematically showing a function of an available bandwidth estimating device according to a third exemplary embodiment of the present invention.

Next, an available bandwidth estimating device according to a third exemplary embodiment of the present invention will be described with reference to FIG. 12.

An available bandwidth estimating device 300 according to the third exemplary embodiment includes:

a transmission rate acquiring means for acquiring a transmission rate, which is an amount of data transmitted by a transmitting device per unit time to a receiving device connected so as to be capable of communicating via a communication network; and an available bandwidth estimating means for estimating an available bandwidth, which is a communication bandwidth available in a communication path between the transmitting device and the receiving device, based on: a mathematical model constructed by representing a relation between the available bandwidth and the transmission rate by a dynamic model including a mobile body that can move in a preset moving direction and an elastic body that transforms in the moving direction by a movement amount of movement of the mobile body in the moving direction; and the acquired transmission rate.

A change of a transmission rate relating to cross traffic caused by a change of a transmission rate relating to self-traffic is well represented by elastic force of an elastic body. Therefore, by configuring the available bandwidth estimating device 300 as described above, it is possible to estimate, with high accuracy, an available bandwidth in a case that a transmission rate relating to self-traffic is changed. As a result, for example, it is possible to properly set a transmission rate relating to self-traffic based on the estimated available bandwidth. Moreover, for example, it is possible to estimate, with high accuracy, reception characteristic information representing a characteristic (e.g., a reception rate, a data loss ratio, a data delay time, or the like) of reception of data by the receiving device.

Although the present invention has been described above with reference to the exemplary embodiments, the present invention is not limited to the exemplary embodiments. The configuration and details of the present invention can be altered in various manners that can be understood by those skilled in the art within the scope of the present invention.

For example, the available bandwidth estimating device configures a transmitting device in the first exemplary embodiment, but may be configured as a device independent of the transmitting device.

The respective functions of the available bandwidth estimating devices in the exemplary embodiments described above are realized by execution of the programs by the CPU, but may be realized by hardware such as a circuit.

Further, the program in each of the exemplary embodiments described above is stored in the storage device, but may be stored in a computer-readable recording medium. For example, the recording medium is a portable medium such as a flexible disk, an optical disk, a magneto-optical disk and a semiconductor memory.

Further, as other modified examples of the exemplary embodiments described above, any combination of the exemplary embodiments and modified examples described above may be employed.

INDUSTRIAL APPLICABILITY

The present invention can be applied to an available bandwidth estimating device that estimates an available bandwidth in a communication network, a server device that delivers content data representing content, or the like.

DESCRIPTION OF REFERENCE NUMERALS 1 content delivery system
100 transmitting device (available bandwidth estimating device)
101 data transmitting part
102 transmission rate acquiring part
103 reception rate acquiring part
104 model parameter estimating part
105 available bandwidth estimating part
106 reception characteristic information estimating part
107 transmission parameter determining part
200 receiving device
201 data receiving part
202 reception information transmitting part
300 available bandwidth estimating device
301 transmission rate acquiring part
302 available bandwidth estimating part

The invention claimed is:
1. An available bandwidth estimating device configured to estimate an available bandwidth and set a transmission rate of a transmitting device based on the estimated available bandwidth, the device comprising:
a hardware processor;
a transmission rate acquiring unit, implemented on the hardware processor, for acquiring the transmission rate, which is an amount of data transmitted by a transmitting device per unit time to a receiving device connected so as to be capable of communicating via a communication network; and
an available bandwidth estimating unit, implemented on the hardware processor, for estimating the available bandwidth, which is a communication bandwidth available in a communication path between the transmitting device and the receiving device, based on: a mathematical model representing a relation between the available bandwidth and the transmission rate and constructed by assuming that a function including at least one of a term proportional to the available bandwidth and a term proportional to a time derivative of the available bandwidth is equal to a function in which the transmission rate is a variable; and the acquired transmission rate, wherein
the mathematical model is constructed by representing the relation between the available bandwidth and the transmission rate by a dynamic model including a mobile body that can move in a preset moving direction and an elastic body that transforms in the moving direction by a movement amount of the mobile body in the moving direction, the mathematical model is constructed on the assumption that external force applied to the mobile body in the moving direction has a magnitude depending on the transmission rate, and that a distance in the moving direction between a preset reference position and a position of the mobile body is the available bandwidth, the mathematical model is constructed on the assumption that elastic force generated by the elastic body has a magnitude of a value as the result of multiplying an amount of movement of the mobile body from a force-free position, which is a position of the mobile body where the elastic force becomes 0, by an elastic modulus, which is a proportionality factor, and that the elastic force works in a direction opposite to a direction in which the mobile body moves from the force-free position, and the available bandwidth estimating device further comprising:

a reception rate acquiring unit, implemented on the hardware processor, for acquiring a reception rate, which is an amount of data received by the receiving device from the transmitting device per unit time;

a model parameter estimating unit, implemented on the hardware processor, for estimating a distance between the reference position and the force-free position and the elastic modulus based on the acquired reception rate, the acquired transmission rate, and the mathematical model; and a transmission parameter determining unit, implemented on the hardware processor, for setting the transmission rate of the transmitting device based on the estimated available bandwidth.

2. The available bandwidth estimating device according to claim 1, wherein the dynamic model includes a viscous body that delays movement of the mobile body in the moving direction due to external force applied to the mobile body.

3. The available bandwidth estimating device according to claim 2, wherein the mathematical model is constructed on the assumption that resistance force generated by the viscous body has a magnitude of a value as the result of multiplying a speed of movement of the mobile body in the moving direction by a viscosity coefficient, which is a proportionality factor, and that the resistance force works in a direction opposite to a direction in which the mobile body moves.

4. The available bandwidth estimating device according to claim 3 further comprising:

a reception rate acquiring unit, implemented on the hardware processor, for acquiring a reception rate, which is an amount of data received by the receiving device from the transmitting device per unit time; and a model parameter estimating unit, implemented on the hardware processor, for estimating the viscosity coefficient based on the acquired reception rate, the acquired transmission rate, and the mathematical model.

5. The available bandwidth estimating device according to claim 1 further comprising:

a reception characteristic information estimating unit, implemented on the hardware processor, for estimating reception characteristic information representing a characteristic of reception of the data by the receiving device based on the estimated available bandwidth.

6. The available bandwidth estimating device according to claim 5, wherein the reception characteristic information includes information representing at least one of:

a reception rate, which is an amount of data received by the receiving device from the transmitting device per unit time;

a data loss ratio, which is a ratio of an amount of data lost in the communication network among the data transmitted by the transmitting device to a total amount of the data transmitted by the transmitting device; and a data delay time, which is a time from a moment of transmission of the data from the transmitting device to a moment of reception of the data by the receiving device.

7. The available bandwidth estimating device according to claim 6, wherein:

the available bandwidth estimating device configures the transmitting device; and the reception characteristic information includes information representing the data loss ratio, the available bandwidth estimating device, comprising:

the transmission parameter determining unit for determining redundancy of the data so that, in a case that part of the data is lost in the communication network at the estimated data loss ratio, the receiving device can restore transmission information by executing an error correction process based on the received data; and a data transmitting unit for encoding the transmission information to generate the data having the determined redundancy and transmit the generated data to the receiving device so that the receiving device can execute the error correction process.

8. The available bandwidth estimating device according to claim 7, wherein the transmission parameter determining unit determines a pair of the transmission rate and the redundancy so as to maximize an amount of the transmission information transmitted per unit time within a range that the receiving device can restore the transmission information by executing the error correction process based on the received data.

9. An available bandwidth estimating device, configured to estimate an available bandwidth and set a transmission rate of a transmitting device based on the estimated available bandwidth, the device comprising:

a hardware processor;

a transmission rate acquiring unit, implemented on the hardware processor, for acquiring the transmission rate, which is an amount of data transmitted by a transmitting device per unit time to a receiving device connected so as to be capable of communicating via a communication network;

an available bandwidth estimating unit, implemented on the hardware processor, for estimating the available bandwidth, which is a communication bandwidth available in a communication path between the transmitting device and the receiving device, based on: a mathematical model representing a relation between the available bandwidth and the transmission rate and constructed by assuming that a function including at least one of a term proportional to the available bandwidth and a term proportional to a time derivative of the available bandwidth is equal to a function in which the transmission rate is a variable; and the acquired transmission rate; and a transmission parameter determining unit, implemented on the hardware processor, for setting the transmission rate of the transmitting device based on the estimated available bandwidth wherein the mathematical model is constructed by representing the relation between the available bandwidth and the transmission rate by a dynamic model including a mobile body that can move in a preset moving direction and an elastic body that transforms in the moving direction by a movement amount of the mobile body in the moving direction, and the dynamic model includes a viscous body that delays movement of the mobile body in the moving direction due to external force applied to the mobile body.

10. An available bandwidth estimating method for estimating an available bandwidth and set a transmission rate of a transmitting device based on the estimated available bandwidth, performed by an information processing device, the method comprising:

acquiring the transmission rate, which is an amount of data transmitted by a transmitting device per unit time to a receiving device connected so as to be capable of communicating via a communication network; and estimating the available bandwidth, which is a communication bandwidth available in a communication path between the transmitting device and the receiving device, based on: a mathematical model representing a relation between the available bandwidth and the transmission rate and constructed by assuming that a function including at least one of a term proportional to the available bandwidth and a term proportional to a time derivative of the available bandwidth is equal to a function in which the transmission rate is a variable; and the acquired transmission rate, wherein the mathematical model is constructed by representing the relation between the available bandwidth and the transmission rate by a dynamic model including a mobile body that can move in a preset moving direction and an elastic body that transforms in the moving direction by a movement amount of the mobile body in the moving direction, the mathematical model is constructed on the assumption that external force applied to the mobile body in the moving direction has a magnitude depending on the transmission rate, and that a distance in the moving direction between a preset reference position and a position of the mobile body is the available bandwidth, the mathematical model is constructed on the assumption that elastic force generated by the elastic body has a magnitude of a value as the result of multiplying an amount of movement of the mobile body from a force-free position, which is a position of the mobile body where the elastic force becomes 0, by an elastic modulus which is a proportionality factor, and that the elastic force works in a direction opposite to a direction in which the mobile body moves from the force-free position, and the available bandwidth estimating method further comprising:

acquiring a reception rate, which is an amount of data received by the receiving device from the transmitting device per unit time;

estimating a distance between the reference position and the force-free position and the elastic modulus based on the acquired reception rate, the acquired transmission rate, and the mathematical model; and setting the transmission rate of the transmitting device based on the estimated available bandwidth.

11. The available bandwidth estimating method performed by an information processing device according to claim 10, wherein the mathematical model is constructed by representing the relation between the available bandwidth and the transmission rate by a dynamic model including a mobile body that can move in a preset moving direction and an elastic body that transforms in the moving direction by a movement amount of the mobile body in the moving direction.

12. The available bandwidth estimating method performed by an information processing device according to claim 11, wherein the mathematical model is constructed on the assumption that external force applied to the mobile body in the moving direction has a magnitude depending on the transmission rate, and that a distance in the moving direction between a preset reference position and a position of the mobile body is the available bandwidth.

13. The available bandwidth estimating method performed by an information processing device according to claim 12, wherein the mathematical model is constructed on the assumption that elastic force generated by the elastic body has a magnitude of a value as the result of multiplying an amount of movement of the mobile body from a force-free position, which is a position of the mobile body where the elastic force becomes 0, by an elastic modulus, which is a proportionality factor, and that the elastic force works in a direction opposite to a direction in which the mobile body moves from the force-free position.

14. A non-transitory computer-readable medium storing a program comprising instructions for causing an available bandwidth estimating device to estimate an available bandwidth and set a transmission rate of a transmitting device based on the estimated available bandwidth, by performing operations including:

acquiring a transmission rate, which is an amount of data transmitted by a transmitting device per unit time to a receiving device connected so as to be capable of communicating via a communication network; and estimating an available bandwidth, which is a communication bandwidth available in a communication path between the transmitting device and the receiving device, based on: a mathematical model representing a relation between the available bandwidth and the transmission rate and constructed by assuming that a function including at least one of a term proportional to the available bandwidth and a term proportional to a time derivative of the available bandwidth is equal to a function in which the transmission rate is a variable; and the acquired transmission rate, wherein the mathematical model is constructed by representing the relation between the available bandwidth and the transmission rate by a dynamic model including a mobile body that can move in a preset moving direction and an elastic body that transforms in the moving direction by a movement amount of the mobile body in the moving direction, the mathematical model is constructed on the assumption that external force applied to the mobile body in the moving direction has a magnitude depending on the transmission rate, and that a distance in the moving direction between a preset reference position and a position of the mobile body is the available bandwidth, the mathematical model is constructed on the assumption that elastic force generated by the elastic body has a magnitude of a value as the result of multiplying an amount of movement of the mobile body from a force-free position, which is a position of the mobile body where the elastic force becomes 0, by an elastic modulus, which is a proportionality factor, and that the elastic force works in a direction opposite to a direction in which the mobile body moves from the force-free position, and the available bandwidth estimating method further comprising:

acquiring a reception rate, which is an amount of data received by the receiving device from the transmitting device per unit time;

estimating a distance between the reference position and the force-free position and the elastic modulus based on the acquired reception rate, the acquired transmission rate, and the mathematical model; and setting the transmission rate of the transmitting device based on the estimated available bandwidth.

15. The non-transitory computer-readable medium according to claim 14, wherein the mathematical model is constructed by representing the relation between the available bandwidth and the transmission rate by a dynamic model including a mobile body that can move in a preset moving direction and an elastic body that transforms in the moving direction by a movement amount of the mobile body in the moving direction.

16. The non-transitory computer-readable medium according to claim 15, wherein the mathematical model is constructed on the assumption that external force applied to the mobile body in the moving direction has a magnitude depending on the transmission rate, and that a distance in the moving direction between a preset reference position and a position of the mobile body is the available bandwidth.

17. The non-transitory computer-readable medium according to claim 16, wherein the mathematical model is constructed on the assumption that elastic force generated by the elastic body has a magnitude of a value as the result of multiplying an amount of movement of the mobile body from a force-free position, which is a position of the mobile body where the elastic force becomes 0, by an elastic modulus, which is a proportionality factor, and that the elastic force works in a direction opposite to a direction in which the mobile body moves from the force-free position.

* * * * *